Figure 1:
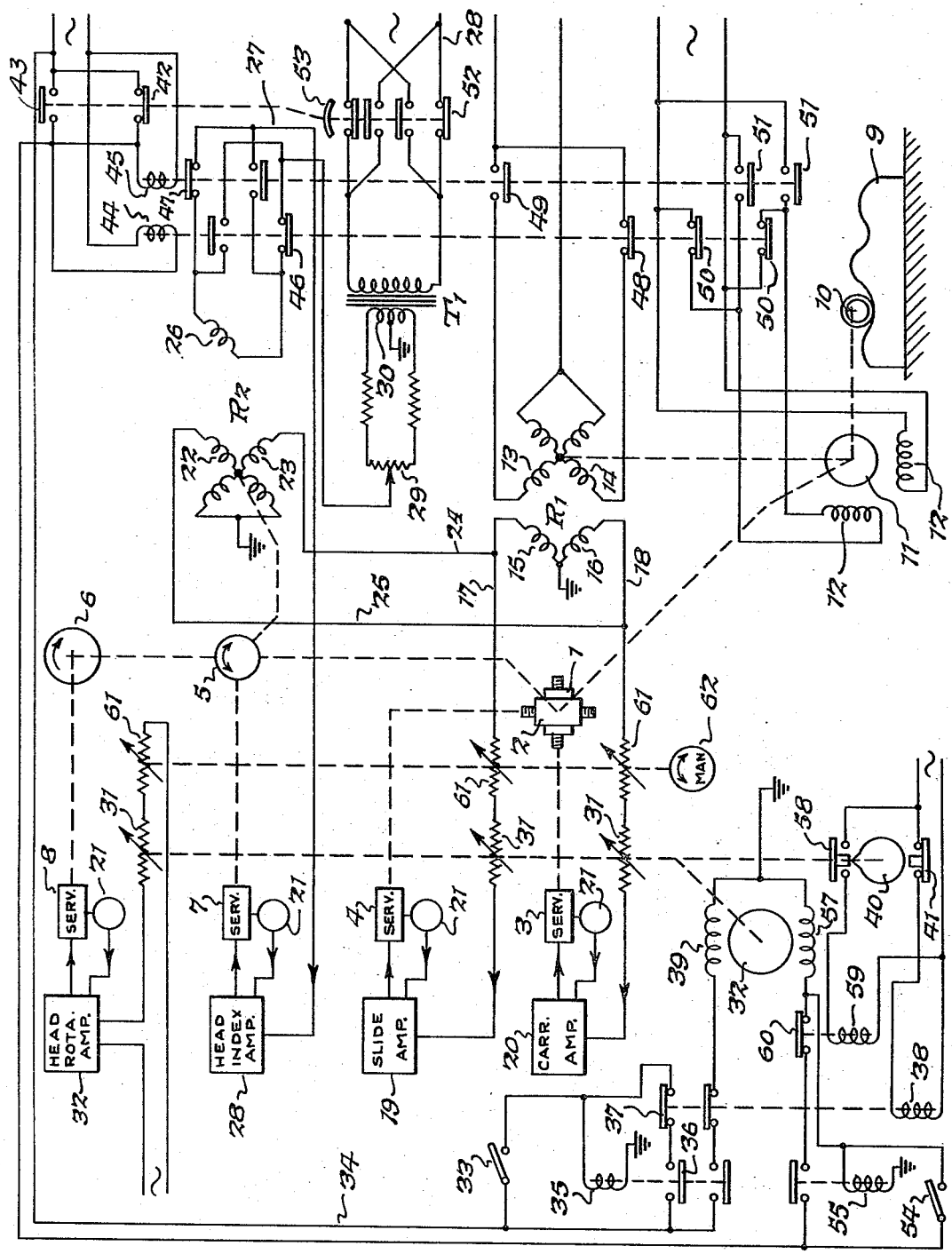

INVENTOR.
Robert H. Eisengrein and
Francis O. Blackwell, III
BY
Christel & Bean
ATTORNEYS.

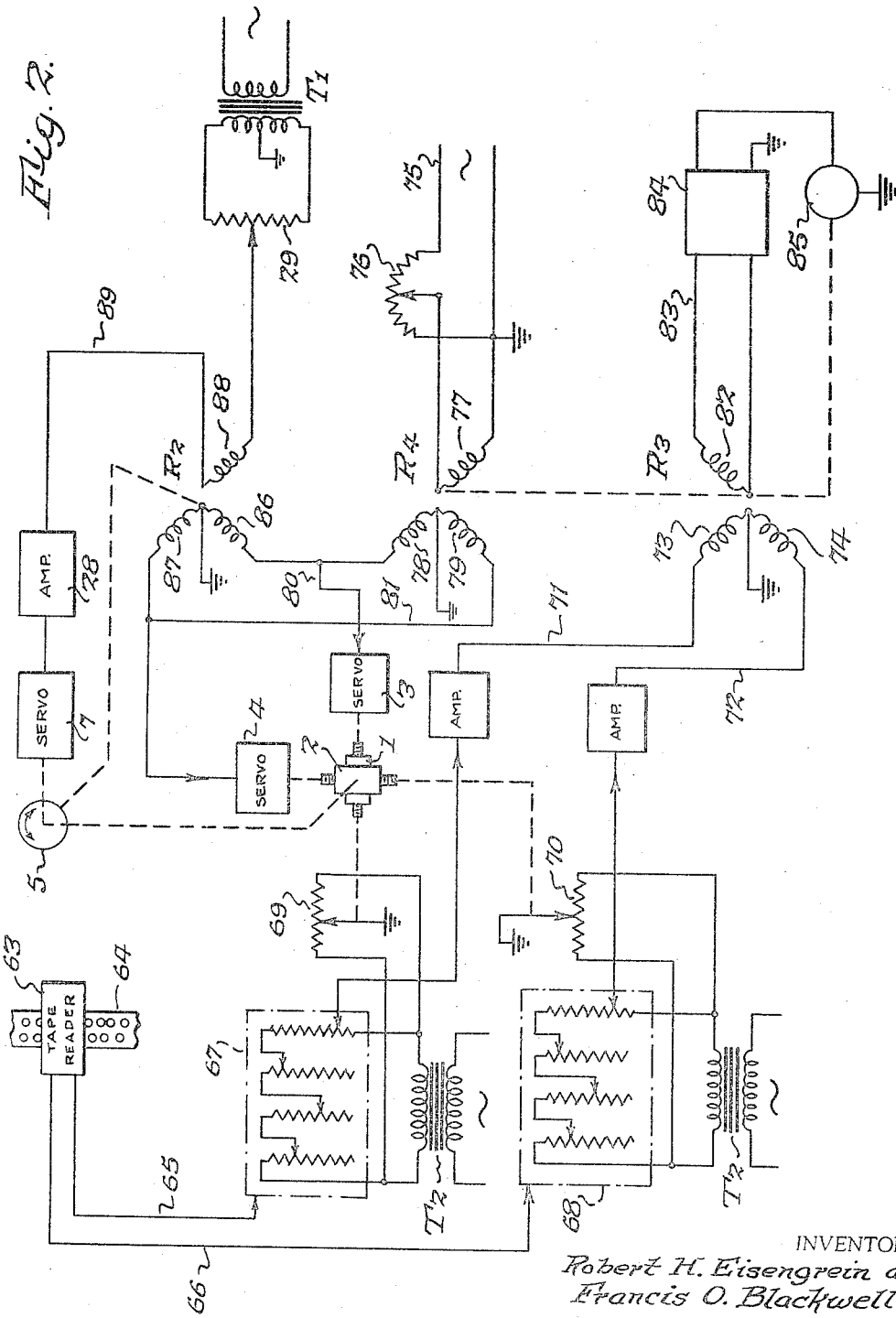

United States Patent Office 3,355,641
Patented Nov. 28, 1967

3,355,641
MACHINE CONTROL SYSTEM INCLUDING MEANS COMPARING A SUPPORT POSITION ALONG ONE AXIS AND ABOUT ANOTHER AXIS
Robert H. Eisengrein, Skaneatales, and Francis O. Blackwell III, Seneca Falls, N.Y., assignors to Seneca Falls Machine Company, Seneca Falls, N.Y.
Filed June 12, 1964, Ser. No. 374,759
10 Claims. (Cl. 318—18)

This invention relates generally to the control art, and more specifically to a new and useful control system for machines.

A primary object of our invention is to provide a machine control system maintaining a predetermined angular orientation of a supporting part relative to the path being followed.

In one aspect thereof, a machine control system constructed in accordance with our invention is characterized by the provision of a support movable along one axis and about another, means including first resolver means generating a signal corresponding to the displacement of the support from a desired position thereof along the one axis, second resolver means coupled to the support for positioning in accordance with the position of the support about the other axis, means comparing the first and second resolver means and generating another signal corresponding to the displacement of the support from a desired position thereof about the other axis, and support drive means responsive to the signals.

The foregoing and other objects, advantages and characterizing features of our invention will become clearly apparent from the ensuing detailed description of two, illustrative embodiments thereof, reference being made to the accompanying drawings wherein like reference numerals denote like parts throughout, and wherein:

FIG. 1 is a schematic layout of one embodiment of a machine control system of our invention; and FIG. 2 is a similar view of a modified embodiment.

Referring now in detail to the illustrative embodiment of our invention depicted in FIG. 1, there is shown a machine having a carriage 1 movable along one axis, referred to as the X axis, and a slide 2 carried by carriage 1 for movement therewith along the X axis, the slide also being movable relative to the carriage along another, right angularly related axis, hereinafter called the Y axis. Carriage 1 and slide 2 are adapted to be driven along their respective axes by servomotor drives 3 and 4, which can be of any suitable type. One suitable form of servomotor drive is disclosed and described in detail in our pending application Ser. No. 285,683, filed June 5, 1963, now Patent 3,187,599, dated June 8, 1965.

A tool support in the form of a head 5 is mounted on slide 2 for movement therewith, and for indexing movement relative thereto in opposite directions about a vertical axis normal to the plane defined by the X and Y axes. Head 5 supports a part 6 mounted for rotation about a fourth axis, normal to the indexing axis of head 5 and lying in a plane parallel to the plane defined by axes X and Y. Head 5 is indexed by a servomotor drive 7, of any suitable construction, while head part 6 is rotated by a suitable servomotor drive 8.

In the embodiment of FIG. 1 carriage 1, slide 2 and head 5 are positioned along and about their respective axes in accordance with a template 9 as sensed by a mechanical contour tracing apparatus of the type described in United States Patent 2,939,368, issued to Robert H. Eisengrein, one of the inventors herein, on June 7, 1960. This contour tracing apparatus has an eccentric stylus 10 coupled to the rotor of a resolver R1 and given a rotary bias by a servomotor 11 having energizing windings 12 connected to a suitable power supply. Motor 11 and resolver R1 are coupled to slide 2, for movement therewith, and motor 11 urges stylus 10 against template 9, with the template reaction torque causing stylus 10 to follow the template contour. The operation of such contour tracing apparatus is fully disclosed in the aforesaid patent, to which reference is hereby made for additional details.

As stylus 10 is driven along template 9, it changes its angular position to follow the template contour, with the quadrature rotor windings 13, 14 changing their angular position in accordance with the angular position of styuls 10. As a result, there is produced in the quadrature stator windings 15, 16 of resolver R1 signals corresponding to the displacement of slide 2 and carriage 1 from the stylus sensed desired position thereof along their respective axes. These signals are transmitted via leads 17, 18 and amplifiers 19, 20 to servo drives 3 and 4, causing carriage 1, slide 2 and head 5 to follow the template contour. Tachometers 21 are coupled to servomotors 3 and 4 in feedback relation thereto, insuring that the speed of carriage 1 and slide 2 along their respective axes is proportional to stylus angle.

It is a particular feature of our invention that the position of head 5 about its index axis can be maintained at a predetermined angle to the path being traversed by stylus 10. To this end, the quadrature rotor windings 22, 23 of a second resolver R2 are mechanically coupled to head 5, for being positioned in accordance with the indexed position of head 5 about its axis. Then, resolver R1 is compared to resolver R2.

This is done by transmitting the output signal from winding 15 via lead 24 to winding 23, and the signal from winding 16 via lead 25 to winding 22 of resolver R2. Unless windings 22, 23 are positioned in exact correspondence with windings 13, 14 of resolver R1, there will be developed a displacement or error signal in the quadrature stator winding 26 and this is transmitted via lead 27 and amplifier 28 to the head index servo drive 7. This causes head 5 to be indexed about its axis, until it is in the desired position. Servo 7 also is provided with a tachometer feedback arrangement, as shown.

In the illustrated arrangement, rotor winding 14 is energized and rotor winding 13 is deenergized. Inasmuch as the windings 22, 23 of resolver R2 are reversed, relative to windings 15, 16 of resolver R1, the stator winding 26 of resolver R2 is connected for electrical positioning in right angular relation to rotor winding 14. Stylus 10 drives resolver R1 to define a position tangential to the contour of template 9, whereby head 5 will be indexed by resolver R2 to a position perpendicular to the template contour.

In some cases it is desired to position head 5 at an angle other than 90° relative to the position defined by resolver R1, and this can be done with our invention. In the illustrated embodiment, such offset positioning of head 5 is accomplished by biasing the output signal from resolver R2. The biasing network includes a transformer T1 energized from a suitable source via leads 28, and an adjustable potentiometer 29 across the center-tapped secondary winding 30 of transformer T1. By varying the adjustment of potentiometer 29, a positive or negative bias is introduced, resulting in a corresponding angular offset of head 5 from the 90° or perpendicular position thereof as defined by resolver R1 under control of the tracing stylus 10.

Where the rotating head part 6 is provided, it is often necessary to maintain a predetermined ratio between the rate of revolution of part 6, and the rate of feed of carriage and slide parts 1, 2. This poses a problem, particularly in accelerating when starting and decelerating when stopping, and is accomplished with our invention as follows. Adjustable potentiometers 31 are provided in the input circuits to servo drives 3 and 4, and the input circuit to servo drive 8, which also has a tachometer feedback circuit. The potentiometers 31 are ganged, as indicated by the broken line showing, and are adjusted under control of an acceleration, deceleration control motor 32, as follows.

As carriage 1 nears the end of its travel in one direction, a limit switch 33 is closed, as by striking a first projection, not shown, on template 9. Closing switch 33 completes an energizing circuit via lead 34, to momentarily energize a relay 35. This closes a switch 36, completing a holding circuit through a switch 37 controlled by a relay 38. Energization of relay 35 also completes a circuit energizing the motor winding 39, causing motor 32 to rotate and adjust the potentiometers 31 in a direction slowing down servos 3, 4 and 8 simultaneously, in a manner maintaining a predetermined ratio between the rate of revolution of part 6 and the rate of feed of parts 1 and 2. Motor 32 also rotates a cam assembly, indicated at 40, which opens a switch 41 after a predetermined deceleration, deenergizing relay 38 and thereby deenergizing relay 35 and winding 39. The system then continues to travel at a reduced rate.

Upon reaching the end of its travel, the system can be made to reverse, by means not shown but well known in the art. When this occurs, reversing switches 42, 43 are shifted, as by striking a second projection, not shown, on template 9.

The reversing switches 42, 43, when shifted from the position shown in FIG. 1, energize relay 44 and deenergize relay 45. Relays 44 and 45 control a first set of switches 46, 47 reversing the bias across stator winding 26 of resolver R2, a second set of switches 48, 49 reversing the energization of the rotor windings of resolver R1, and a third set of switches 50, 51 reversing the energization of servomotor 11 for biasing stylus 10 in the reverse direction, for a reverse direction of travel along the contour of template 10. The energization of transformer T1 in the biasing network also can be reversed, if desired, by the ganged switches 52. This can be done manually, by a control 53, or it can be accomplished automatically by reversing switches 42, 43. If the bias network is reversed, head 5 will maintain the desired offset angle, relative to the template contour, with the system in reverse.

Upon the start of travel in either direction, a limit switch 54 is closed, completing an energizing circuit to relay 55 which in turn closes contact 56 to complete an energizing circuit to the acceleration winding 57 of motor 32, and a holding circuit for relay 55. Switch 58 previously was permitted to close, by cam assembly 40, upon decelerating, energizing relay 59 to close switch 60. This drives motor 32 in the opposite direction, adjusting potentiometers 31 in a direction accelerating the carriage and slide drive servos 3 and 4, and the rotating head part servo 8, while maintaining a predetermined ratio between the rate of revolution of the head part and the rate of feed of the carriage and slide. Motor 32 also rotates cam assembly 40, in the reverse direction toward the position shown in FIG. 1, whereby when the system is up to speed, contact 58 will be opened by the cam assembly, deenergizing motor 32. The system then continues at the preselected feed rate, until such time as switch 33 is again momentarily closed, near the end of system travel, to complete the deceleration energizing circuit as previously described.

Where it is desired to vary the normal speed of the system, potentiometers 61 are provided in the input circuits to servos 3, 4 and 8, for simultaneous adjustment under a manual control 62, whereby the speed of servos 3, 4 and 8 can be varied while maintaining a predetermined ratio between rate of revolution of head part 6 and rate of feed of parts 1 and 2.

It will be appreciated that the system of FIG. 1 is operable, with rotating head part 6 and its drive 8 completely omitted. Also, it will be appreciated that this system is applicable to a wide variety of machines. For example, the rotating part 6 can support a winding tool or mechanism, for winding insulation or some other material about a work piece, not shown. In such a case, head 5 simply mounts the rotating part 6. Alternately, part 6 can be omitted and head 5 can mount a cutting tool, as on a lathe. Therefore, the term head is used in a broad sense, to include a tool block as well as a support for a rotating part, and the word tool also is used in a broad sense.

The two resolver system for maintaining a desired orientation of head 5 can be operated under tape control, as well as by a template tracing control. Such a system is shown in FIG. 2, in conjunction with a tape control system such as disclosed in our pending application Ser. No. 212,769, filed July 26, 1962, now Patent 3,188,541, dated June 8, 1965, to which reference is hereby made for further details.

In the system of FIG. 2, there is provided a tape reading mechanism 63 adapted to read information carried by a tape 64 which can be a standard 8 channel tape. The information on tape 64 is transferred from the reading mechanism 63 via leads 65 and 66 to groups of high speed relay storage modules 67 and 68, respectively. The groups 67, 68 are of a known type, per se, comprising in the illustrated embodiment a series of voltage dividing devices.

Relay groups 67, 68 convert the digital target position information from tape 64 into analog information, with group 67 defining the desired position of carriage 1 along the X axis, and with group 68 defining the desired target position of slide 2 along the Y axis.

The relay groups 67, 68 are combined into balance bridge arrangements with adjustable potentiometers 69, 70, respectively, which latter are coupled to the carriage 1 and slide 2 for adjustment in accordance with the actual position thereof. The balance bridges are energized from suitable sources through transformers T2.

As described in greater detail in our aforesaid application Ser. No. 212,769, if the actual position of carriage 1 along the X axis does not correspond to the X axis component of the target position, that bridge is unbalanced, producing an output signal corresponding in amplitude to the magnitude of displacement along the X axis, and in phase to the direction of such displacement. The same is true, with respect to slide 2 on the Y axis. These signals are transmitted via leads 71 and 72 to the quadrature stator winding 73, 74, respectively, of an angle computing resolver R3. The displacement signals are combined by the resolver winding 73, 74 to produce a resulting field having an angle determined by the straight line direction from the actual position of the carriage and slide to the succeeding, preselected target position thereof.

The rate of feed of the carriage and slide is determined by the rate of feed input signal transmitted via lead 75 and adjustable potentiometer 76 to the armature winding 77 of a speed direction resolver R4. Resolver R4 has quadrature stator windings 78, 79 which resolve the feed rate signal across winding 77 into X axis and Y axis components, respectively. These components are transmitted via leads 80 and 81 to the servo drives 3 and 4.

Resolver R4 is controlled by resolver R3, to cause the direction of movement of the carriage and slide to coincide with the target direction, as follows. If the angular position of armataure winding 82 of resolver R3 does not coincide with the resultant field angle, an error signal is produced across winding 82, being transmitted via lead 83 and amplifier 84 to a zeroing servomotor 85. This error signal has a magnitude corresponding to the extent of angular displacement of winding 82 from the field angle, and a polarity corresponding to the direction of such displacement. Motor 85 is mechanically connected to the armature winding 82 of resolver R3, and turns that resolver winding until it coincides with the resultant field angle of resolver R3, whereupon no signal is produced in winding 82 and motor 85 stops. This zeroing alinement is substantially instantaneous and, because armature winding 77 of direction resolver R4 is mechanically connected to armature winding 82 of the angle computing resolver R3, it, too will be turned and zeroed into alinement with the resultant field angle of resolver R3, to define a speed direction corresponding to the direction of movement from the actual position to the target position.

The foregoing is described in greater detail, in our aforesaid application Ser. No. 212,769, and can have both the lockout control and the offset circuits described therein, reference being made to said application for such details.

Head 5, carried by slide 2, is indexed to a predetermined angle, comprising in the illustrated instance an angle normal to the direction of movement from the actual position to the target position, through the indexing resolver R2, as follows. The X and Y signals are transmitted from the quadrature stator windings 78, 79 to the quadrature rotor windings 86, 87, respectively, of resolver R2. The rotor of resolver R2 is coupled to head 5, as described in connection with the embodiment of FIG. 1, whereby if head 5 is not indexed to a position perpendicular to the direction of travel from the actual position to the target position, as defined in resolver R4, there will be produced an error signal in the stator winding 88, which signal is transmitted via lead 89 to the servo 7, for indexing head 5 to the predetermined relative orientation thereof. The angle of orientation, desired to be maintained in head 5, can be biased, through the biasing network previously described.

It will be appreciated that start and stop switches will be provided for the illustrated systems, and that each system component can be provided with control switches for actuating it independently of the others, if desired. These and other details have been omitted from the foregoing detailed description, for simplicity and greater clarity.

Accordingly, it is seen that our invention fully accomplishes its intended objects. While we have disclosed and described in detail only two embodiments of our invention, that has been done by way of illustration, it being our invention that the scope of our invention be defined by the appended claims.

Having fully disclosed and completely described our invention, and its mode of operation, what we claim as new is:

1. A machine control system comprising a support movable along one axis and about another axis, means including first resolver means generating a signal corresponding to the displacement of said support from a desired position thereof along said one axis, second resolver means coupled to said support for positioning in accordance with the position of said support about said other axis, means comparing said first and second resolver means and generating another signal corresponding to the displacement of said support from a desired position thereof about said other axis, and support drive means responsive to said signals.

2. A machine control system as set forth in claim 1, together with means biasing said other signal for offset positioning of said support about said other axis.

3. A machine control system comprising a support movable along first and second axes and about a third axis, means including first resolver means generating signals corresponding to the displacement of said support from a desired position thereof along said first and second axes, support drive means responsive to said first and second signals, second resolver means coupled to said support for positioning in accordance with the position of said support about said third axis, means comparing said first and second resolver means and generating a third signal corresponding to the displacement of said support from a desired position thereof about said third axis, and support drive means responsive to said third signal.

4. A machine control system as set forth in claim 3, wherein said first resolver means is positioned by template engaging tracer means.

5. A machine control system as set forth in claim 3, wherein said first resolver means is positioned by a tape control.

6. A machine control system comprising a carriage movable along a first axis, a slide movable with said carriage along said first axis and relative thereto along a second axis, a head movable with said slide along said first and second axes, said head being movable about a third axis, template engaging tracer means, means including first resolver means positioned by said tracer means generating first and second signals corresponding to the displacement of said carriage and said slide from a desired position thereof along said first and second axes, carriage and slide drive means responsive to said first and second signals, second resolver means coupled to said head for positioning in accordance therewith, means comparing said first and second resolver means and generating a third signal corresponding to the displacement of said head from a desired position thereof about said third axis, and head drive means responsive to said third signal.

7. A machine control system as set forth in claim 6, together with means baising said third signal for offset positioning of said head about said third axis.

8. A machine control system as set forth in claim 7, wherein said carriage drive is reversible, together with means for reversing said third signal biasing means.

9. A machine control system as set forth in claim 6, wherein said head has a part rotatable about a fourth axis, together with drive means for said part, and means to simultaneously accelerate and decelerate said carriage, slide and head part drive means thereby to maintain a preselected ratio between the rate of feed of said carriage and slide and the rate of rotation of said head part.

10. A machine control system as set forth in claim 9, together with means for selectively varying the rate of feed of said carriage and slide drive means and the rate of rotation of said head part while maintaining a predetermined ratio therebetween.

No references cited.

ORIS L. RADER, *Primary Examiner.*

G. SIMMONS, *Assistant Examiner.*